(12) United States Patent
Pandranki et al.

(10) Patent No.: US 9,523,050 B2
(45) Date of Patent: Dec. 20, 2016

(54) METHODS FOR CO-PROCESSING RENEWABLE FEEDSTOCK AND PETROLEUM DISTILLATE FEEDSTOCK

(71) Applicant: UOP LLC, Des Plaines, IL (US)

(72) Inventors: Venkat Ram Naidu Pandranki, Dubai (AE); Krishnan Vaidyanathan, Dubai (AE)

(73) Assignee: UOP LLC, Des Plaines, IL (US)

( * ) Notice: Subject to any disclaimer, the term of this patent is extended or adjusted under 35 U.S.C. 154(b) by 218 days.

(21) Appl. No.: 14/574,603

(22) Filed: Dec. 18, 2014

(65) Prior Publication Data

US 2016/0177201 A1    Jun. 23, 2016

(51) Int. Cl.
| | |
|---|---|
| *C10G 1/00* | (2006.01) |
| *C10G 51/02* | (2006.01) |
| *C10G 65/12* | (2006.01) |
| *C10G 3/00* | (2006.01) |
| *C10G 67/02* | (2006.01) |

(52) U.S. Cl.
CPC ............... *C10G 65/12* (2013.01); *C10G 3/48* (2013.01); *C10G 67/02* (2013.01)

(58) Field of Classification Search
CPC .................................. C10G 1/00; C10G 51/02
USPC .... 585/240, 241, 242; 208/62, 254 R, 208 R
See application file for complete search history.

(56) References Cited

U.S. PATENT DOCUMENTS

| | | | |
|---|---|---|---|
| 8,668,823 B2 | 3/2014 | Gudde et al. | |
| 8,686,204 B2 * | 4/2014 | Bozzano .................. | C10G 3/42 208/89 |
| 2012/0017492 A1 | 1/2012 | Ramirez Corredores et al. | |
| 2012/0216448 A1 | 8/2012 | Ramirez Corredores et al. | |
| 2014/0163272 A1 | 6/2014 | Mukherjee et al. | |

FOREIGN PATENT DOCUMENTS

WO    WO 2010/049075 A2    5/2010

* cited by examiner

*Primary Examiner* — Thuan D Dang

(57) ABSTRACT

Processes for co-processing renewable feedstock and petroleum distillate feed. The petroleum distillate feed is hydrotreated in a first reaction zone. The renewable feedstock is deoxygenated in a second reaction zone. The effluent stream from the two reaction zones are combined. A heavy portion of the combined effluent stream may be hydrocracked. Hydrogen sulfide may be removed from the effluent and used in the second reaction zone to maintain the catalyst during periods of non-processing.

20 Claims, 1 Drawing Sheet

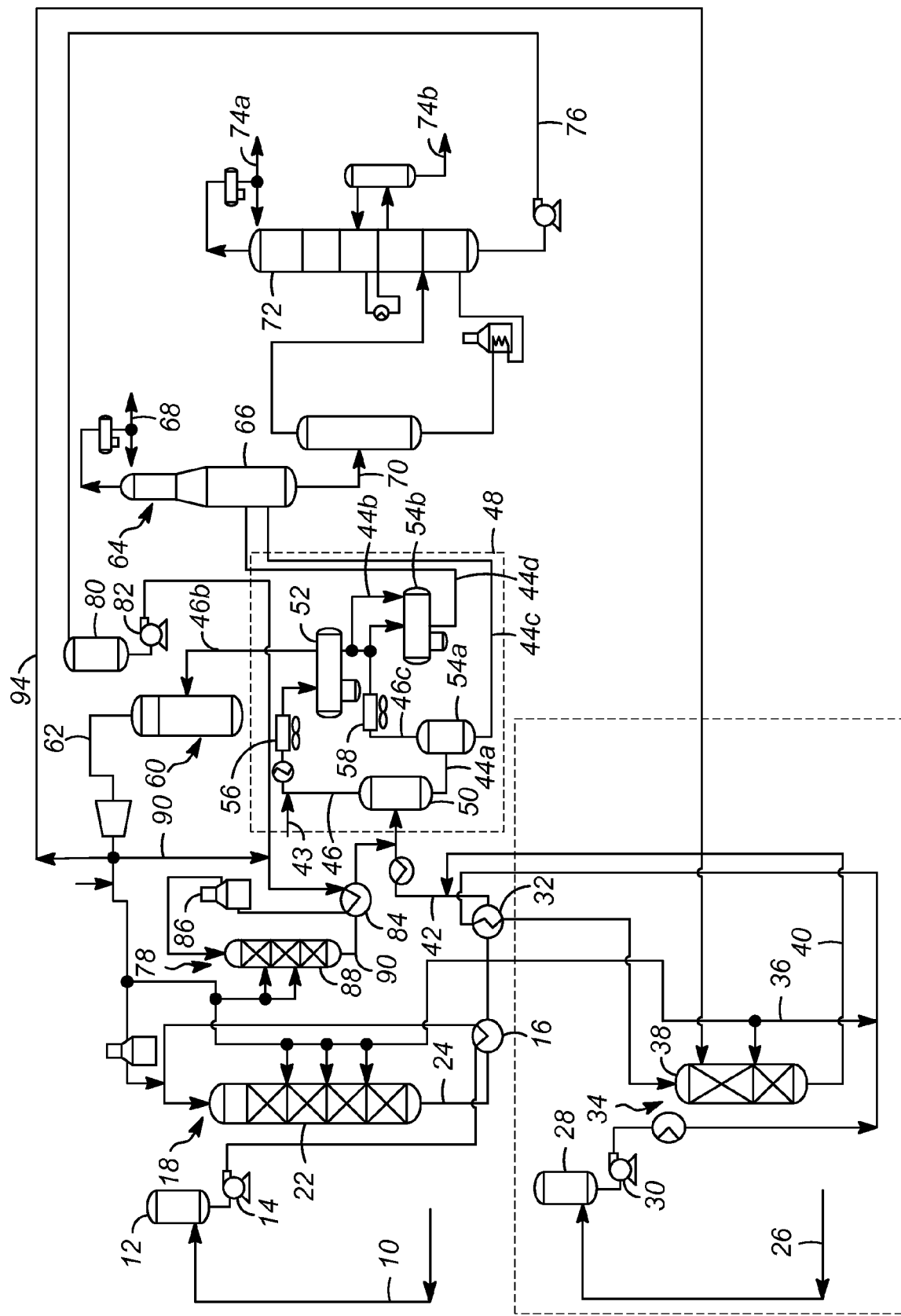

METHODS FOR CO-PROCESSING RENEWABLE FEEDSTOCK AND PETROLEUM DISTILLATE FEEDSTOCK

FIELD OF THE INVENTION

The present invention relates to methods for co-processing a renewable feedstock and a petroleum distillate feedstock.

BACKGROUND OF THE INVENTION

As the worldwide demand for fuel increases, there is increasing interest in sources other than crude oil for producing diesel fuel. One source of interest is renewable sources, such as vegetable oils and animal fats. A conventional catalytic hydroprocessing process known for converting a renewable feedstock into green diesel fuel may be used as a substitute for the diesel fuel produced from crude oil. The highly exothermic process also supports the possible co-production of propane and other light hydrocarbons, as well as naphtha or green jet fuel. As used herein, the terms "green diesel fuel" and "green jet fuel" refer to fuel produced from renewable sources, in contrast to those produced from crude oil. To produce the green diesel fuel, the renewable feedstock is combined with hydrogen, brought to reaction temperature, and is then sent to a reactor where the renewable feedstock is converted in the presence of a deoxygenation catalyst into a reaction product. The reaction product comprises a liquid fraction and a gaseous fraction. The liquid fraction comprises a hydrocarbon fraction containing normal paraffins. Although this hydrocarbon fraction is useful as a diesel fuel, it has poor cold flow properties. To improve the cold flow properties of the hydrocarbon fraction, the liquid fraction may be contacted with an isomerization catalyst under isomerization conditions to at least partially isomerize the normal paraffins to iso-paraffins. Whether or not isomerization is carried out, the liquid fraction is separated from the gaseous fraction and sent to a fractionation unit to produce the green diesel fuel. The green diesel fuel meets ultra-low sulfur diesel specifications.

Often times, the processing of the renewable feedstock is done intermittently due to availability of renewable feedstock.

However, the deoxygenation catalyst used in the process must remain sulfided when no feed is processed and it is under hydrogen circulation to maintain its performance, but tends to reduce or strip sulfur from the catalyst under those conditions. Separate catalyst sulfide injection systems providing an external source of a sulfiding agent (usually hydrogen sulfide) are typically required to maintain the deoxygenation catalyst in its sulfided form and hydrogen sulfide is an expensive additive and the separate systems increase processing complexity and cost. Hydrogen sulfide may be produced from desulfurizing sulfur-containing petroleum distillate feedstock that refiners typically have in abundant supply.

Since the hydrogen sulfide from processing petroleum distillate feedstock is useful in the processing of renewable feedstock, refiners have tried to co-process petroleum distillate feed and renewable feedstock in a single hydrotreating reactor with the deoxygenation reactions occurring in the same reactor as the desulfurization reaction. However, since the renewable feedstock typically has a higher concentration of chloride compared to the petroleum distillate feed, processing renewable feed stock alone can result in a significant quantity of hydrochloric acid in the reactor effluent as various stages in which water (liquid or steam) may be present. The hydrochloric acid is highly corrosive and can damage equipment and downstream processing units.

Accordingly, it is desirable to provide a method for co-processing a renewable feedstock and a petroleum distillate feedstock to produce a hydrocarbon fraction that will provide a green diesel fuel and maintain the deoxygenation catalyst in a sulfided form, thereby reducing the amount of or eliminating the external sulfiding agent, and at the same time, having such a process that does not result in the severe corrosion due to hydrochloric acid.

SUMMARY OF THE INVENTION

One or more process for co-processing a renewable feedstock and a petroleum distillate feed have been invented.

Accordingly, in a first aspect of the present invention, the present invention may be broadly characterized as a process for co-processing a petroleum distillate feed and a renewable feedstock by: hydrotreating a petroleum distillate feed in a hydrotreating zone comprising at least one reactor with a hydrotreating catalyst to provide a hydrotreated effluent; deoxygenating a renewable feedstock in a deoxygenation zone comprising at least one reactor with a deoxygenation catalyst to provide a deoxygenated effluent; combining the hydrotreated effluent and the deoxygenated effluent to form a combined effluent; and, hydrocracking at least a portion of the combined effluent in a hydrocracking zone comprising at least one reactor with an acidic hydrocracking catalyst to provide a hydrocracked effluent.

In at least one embodiment, the process further comprises heating the deoxygenated effluent with the hydrotreated effluent.

In various embodiments, the process further comprises combining the hydrocracked effluent with the combined effluent.

In some embodiments, the process further comprises separating the combined effluent in a fractionation zone into a one or more petroleum fractions and a bottoms stream, wherein the bottoms stream is the portion of the combined effluent that is hydrocracked hydroprocessed.

In one or more embodiments, the process further comprises stripping hydrogen sulfide from at least a portion of the combined effluent and maintaining the deoxygenation catalyst with recycle gas comprising the hydrogen sulfide stripped from the at least a portion of the combined effluent.

In various embodiments, the process further comprises heating the petroleum distillate feed with the hydrotreated effluent and heating the renewable feedstock with the hydrotreated effluent.

In a second aspect of the present invention, the present invention may be broadly characterized as a process for co-processing a petroleum distillate feed and a renewable feedstock by: heating a petroleum distillate feed to provide a heated petroleum distillate feed; passing the heated petroleum distillate feed to a hydrotreating zone comprising at least one reactor being operated at hydrotreating conditions with a hydrotreating catalyst to provide a hydrotreated effluent; passing a renewable feedstock to a deoxygenation zone comprising at least one reactor being operated under deoxygenation conditions with a deoxygenation catalyst to provide a deoxygenated effluent; combining the hydrotreated effluent and the deoxygenated effluent to form a combined effluent; separating the combined effluent into at least one transportation fuel stream and a bottoms stream; and, passing the bottoms stream to a hydrocracking zone comprising at least one reactor being operated under hydrocracking conditions with an acidic hydrocracking catalyst to provide a hydrocracked effluent.

In various embodiments, the process further comprises heating the renewable feedstock to provide a heated renewable feedstock, wherein the heated renewable feedstock is passed to the deoxygenation zone.

In some embodiments, the process further comprises combining the hydrocracked effluent and the combined effluent. It is contemplated that the process may further comprise passing the hydrocracked effluent and the combined effluent to a separation zone. It is even further contemplated that the process includes passing at least one liquid effluent stream from the separation zone to a stripping zone and removing hydrogen sulfide from the at least one liquid effluent stream in the stripping zone to provide a sweetened effluent. It is also contemplated that the process includes passing the sweetened effluent to a fractionation zone, wherein the fractionation zone separates the sweetened effluent into the at least one transportation fuel stream and the bottoms stream.

In some embodiments, the process includes passing a hydrogen sulfide from a stripping zone to the deoxygenation zone. It is even further contemplated that the renewable feedstock is passed to the deoxygenation zone intermittently and also that the hydrogen sulfide is passed to the deoxygenation zone when the renewable feedstock is not being passed to the deoxygenation zone.

In at least one embodiment, the petroleum distillate feed is heated with the hydrotreated effluent.

In a third aspect of the present invention, the present invention may be broadly characterized as a process for co-processing a petroleum distillate feed and a renewable feedstock by: continuously hydrotreating a petroleum distillate feed in a hydrotreating zone comprising at least one reactor with a hydrotreating catalyst to provide a hydrotreated effluent; intermittently deoxygenating a renewable feedstock in a deoxygenation zone comprising at least one reactor with a deoxygenation catalyst to provide a deoxygenated effluent; combining the hydrotreated effluent and the deoxygenated effluent to form a combined effluent; hydrocracking at least a portion of the combined effluent in a hydrocracking zone comprising at least one reactor with an acidic hydrocracking catalyst to provide a hydrocracked effluent; separating hydrogen sulfide from an effluent stream in the form of a recycle gas; and, passing the recycle gas to the deoxygenation zone when the renewable feedstock is not being deoxygenating.

In some embodiments, the process further includes heating the renewable feedstock with the hydrotreated effluent.

In at least one embodiment, the process also includes heating the petroleum distillate feed with the hydrotreated effluent. It is contemplated that the process includes separating the combined effluent in a fractionation zone into a plurality of streams and passing a stream from the fractionation zone to the hydrocracking zone.

Additional aspects, embodiments, and details of the invention are set forth in the following detailed description of the invention.

DETAILED DESCRIPTION OF THE DRAWINGS

In the drawings of the present invention, one or more embodiments are shown in which like numerals denote like elements, and in which the FIGURE depicts a process flow diagram according to one or more embodiments of the present invention.

DETAILED DESCRIPTION OF THE INVENTION

As mentioned above, one or more processes for co-processing a renewable feedstock and a sulfur-containing petroleum distillate feed to produce at least a hydrocarbon fraction useful as a green diesel fuel. The renewable feedstock is deoxygenated in a deoxygenation reaction zone and the petroleum distillate feed is hydrotreated in a hydrotreating zone. The effluents of the deoxygenation reaction zone and the hydrotreating zone are combined and processed further. The deoxygenation catalyst may be maintained in a sulfided form by hydrotreating the petroleum distillate feedstock in a hydrotreating reactor to convert at least a portion of the sulfur therein into hydrogen sulfide. By combining the hydrotreating and the deoxygenating reactor effluents, corrosion of downstream equipment due to chlorides can be minimized. The chlorides in renewable feed form hydrochloric acid and nitrogen in petroleum feed form ammonia. Both hydrochloric acid and ammonia can combine to form ammonium chloride which sublimates and can be easily removed by dissolving in water.

With these general principles of the present invention in mind, one or more exemplary embodiments of the present invention will now be described with the understanding that the following is exemplary in nature and is not intended to be limiting.

As shown in the FIGURE, in accordance with an exemplary embodiment, a process for co-processing a renewable feedstock and a petroleum distillate feed begins with a petroleum distillate feedstock 10. The petroleum distillate feed 10 may be commercially available or available elsewhere in the same refinery used to process renewable feedstock into green diesel fuel and other possible co-products. As will be appreciated, the petroleum distillate feed 10 may be pretreated.

The petroleum distillate feed 10 is generally a distillable petroleum-derived fraction having a boiling point range which is above that of naphtha. Suitable petroleum distillate feed 10 that may be obtained from refinery fractionation and conversion operations include middle distillate hydrocarbon streams, such as highly aromatic hydrocarbon streams. Petroleum distillate feed 10 as hereinafter described include distillate hydrocarbons boiling at a temperature greater than about 149° C. (300° F.), typically boiling in the range from about 149 to 399° C. (300 to 750° F.), and often boiling in the range from about 204 to about 371° C. (400 to 700° F.).

Representative petroleum distillate feed 10 include various other types of hydrocarbon mixtures, such as straight-run fractions, or blends of fractions, recovered by fractional distillation of crude petroleum. Such fractions produced in refineries include coker gas oil and other coker distillates, straight run gas oil, deasphalted gas oil, and vacuum gas oil. These fractions or blends of fractions can therefore be a mixture of hydrocarbons boiling in range from about 343 to about 566° C. (650 to 1050° F.), with boiling end points in other embodiments being below about 538° C. (1000° F.) and below about 482° C. (900° F.). Thus, petroleum distillate feed 10 are often recovered from crude oil fractionation or distillation operations, and optionally following one or more hydrocarbon conversion reactions. However, petroleum distillate feed 10 may be utilized from any convenient source such as tar sand extract (bitumen) and gas to liquids conversion products, as well as synthetic hydrocarbon mixtures such as recovered from shale oil or coal.

Highly aromatic, substantially dealkylated hydrocarbons, especially suitable as petroleum distillate feed 10, are produced during fluid catalytic cracking (FCC) of vacuum gas oils to produce high octane gasoline boiling range hydrocarbons. FCC is a thermally severe process which is operated without the presence of added hydrogen to reject carbon to coke and to produce residual fractions. During catalytic cracking, the components of the high molecular weight feedstock disproportionate into relatively hydrogen-rich light liquids and aromatic, hydrogen-deficient heavier distillates and residues. Catalytic cracking in the absence of hydrogen does not provide significant desulfurization, nor are the sulfur- and nitrogen-containing compounds of the FCC feed selectively rejected with the coke. These sulfur and nitrogen compounds therefore concentrate in heavier cracked products that are produced in significant quantities and characterized as being highly aromatic, hydrogen-deficient middle and heavy distillates with high sulfur and nitrogen levels. One such product is known in the refining industry as Light Cycle Oil (LCO), which is often characterized in the industry as a "cracked stock" or "cracked stock boiling in the distillate range." References throughout this disclosure to a "distillate" or a "petroleum distillate feedstock" are therefore understood to include converted hydrocarbon products, such as LCO, having boiling ranges that are representative of distillate fractions. Highly aromatic petroleum distillate feedstocks such as LCO therefore comprise a significant fraction of polyaromatics such as 2-ring aromatic compounds (e.g., fused aromatic rings such as naphthalene and naphthalene derivatives) as well as multi-ring aromatic compounds. Typically, the combined amount of 2-ring aromatic compounds and multi-ring aromatic compounds is at least about 40 wt %, normally at least about 60 wt %, and often at least about 70 wt %, of the petroleum distillate feedstock 10, whereas the amount of mono-ring aromatic compounds (e.g., benzene at benzene derivatives such as alkylaromatic compounds) typically represents at most about 40 wt %, normally at most about 25 wt %, and often at most about 15 wt %, of the petroleum distillate feedstock 10.

Petroleum distillate feed 10 suitable for use according to exemplary embodiments will contain organic nitrogen compounds and organic sulfur compounds. For example, LCO and other petroleum distillate feeds 10 typically contain from about 0.1 to about 4%, normally from about 0.2 to about 2.5%, and often from about 0.5 to about 2%, by weight of total sulfur, substantially present in the form of organic sulfur compounds such as alkylbenzothiophenes. Such petroleum distillate feed 10 also generally contain from about 100 ppm to about 1000 ppm, and normally from about 100 ppm to about 750 ppm, by weight of total nitrogen, substantially present in the form of organic nitrogen compounds such as non-basic aromatic compounds including carbazoles. In order to reduce the sulfur and nitrogen content the petroleum distillate feed 10 is hydrotreated.

Returning to the FIGURE, the petroleum distillate feed 10 is passed, typically by a feed transfer pump (not shown), into a distillate feed surge drum 12. The petroleum distillate feed 10 flows from the distillate feed surge drum 12 via a distillate charge pump 14 to a heat exchanger 16 where it may be heated. The heated petroleum distillate feed 10 is passed into a hydrotreating reaction zone 18. The petroleum distillate feed 10 may be combined with a hydrogen gas stream 20 which may comprise a recycle gas stream, a fresh hydrogen gas stream, or a combination thereof.

The hydrotreating reaction zone 18 comprises one or more a reaction vessels 22 which include a catalyst and which are operated under appropriate conditions such that the organic sulfur compounds in the petroleum distillate feedstock are converted into hydrogen sulfide ($H_2S$) and the organic nitrogen compounds are converted into ammonia ($NH_3$). As used herein, "hydrotreating" refers to desulfurization and denitrogenation of the petroleum distillate feedstock 10 containing sulfur and nitrogen, as hereinafter described. Hydrotreating catalysts and conditions are known to one skilled in the art. Exemplary hydrotreating catalysts comprise Group VIII metals such as nickel and/or cobalt and Group VI metals such as molybdenum and/or tungsten on a high surface area support such as alumina. The Group VIII metal typically comprises about 2 to about 20 wt % and the Group VI metal typically comprises about 1 to about 25 wt %. Exemplary hydrotreating conditions comprise a temperature of about 260 to about 454° C., a hydrogen partial pressure of about 2000 to about 14000 kPa (typically about 4000 to about 7000 kPa), and a liquid hourly space velocity (LHSV) of about 0.5 to about 10 $hr^{-1}$ (typically about 1 $hr^{-1}$ to about 3 $hr^{-1}$).

An effluent 24 from the hydrotreating reaction zone 18 will comprises a mixture of desulfurized hydrocarbons, hydrogen sulfide, and ammonia. It is contemplated that the effluent 24 from the hydrotreating reaction zone 18 may heat the petroleum distillate feedstock 10 in the heat exchanger 16.

In the various processes of the present invention, a renewable feedstock 26 will also be initially treated. A variety of different renewable feedstocks 26 may be converted into green diesel fuel and co-products. Examples of such feeds may include canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm kernel oil, crambe oil, fatty acid methyl esters, and lard. The glycerides, FAAEs and FFAs of the typical vegetable or animal fat may contain aliphatic hydrocarbon chains in their structure that can have about 8-about 24 carbon atoms with many of the oils containing high concentrations of fatty acids with 16-18 carbon atoms. The renewable feedstock 26 may be pretreated to remove contaminants as well known in the art.

Returning to the FIGURE, a renewable feedstock 26 is passed to a renewable feed surge drum 28 and flows from the renewable feed surge drum 28 via a renewable charge pump 30 to a heat exchanger 32 where it is heated. It is contemplated that the renewable feedstock 26 is heated in the heat exchanger 32 by the effluent 24 from the hydrotreating reaction zone 18. The heated renewable feedstock 26 is then passed to a deoxygenation reaction zone 34. The renewable feedstock 26 may be combined with a hydrogen gas stream 36 which may comprise a recycle gas stream, a fresh hydrogen gas stream, or a combination thereof.

The deoxygenation reaction zone 34 comprises one or more a reaction vessels 38 which include a deoxygenation catalyst and which are operated under appropriate conditions to hydrogenate the oxygen in the olefinic or unsaturated portions of the normal paraffinic chains in the renewable feedstock 26. Deoxygenation catalysts are well known in the art such as nickel, nickel/molybdenum, or cobalt/molybdenum dispersed on a high surface area support. Other deoxygenation catalysts include one or more noble metal catalytic elements dispersed on a high surface area support. Non-limiting examples of noble metals include Pt and/or Pd dispersed on gamma-alumina. The deoxygenation catalysts are also capable of catalyzing decarboxylation and/or hydrodeoxygenation of the feedstock to remove oxygen therefrom. Decarboxylation and hydrodeoxygenation are herein collectively referred to as "deoxygenation" reactions.

Deoxygenation conditions include a relatively low pressure of about 3447 to about 6895 kPa (500 to 1000 psia), a temperature of about 288 to about 345° C. and a liquid hourly space velocity of about 1 to about 4 hr$^{-1}$. The deoxygenation catalysts are also capable of catalyzing decarboxylation and/or hydrodeoxygenation of the renewable feedstock 26 to remove oxygen therefrom. Decarboxylation and hydrodeoxygenation are herein collectively referred to as deoxygenation reactions. As mentioned at the outset, due to chlorides present in tallow or animal fat, the renewable feedstock 26 typically has a relative high chloride content and an effluent 40 from the deoxygenation reaction zone 34 will include the paraffinic hydrocarbons, as well as some hydrochloric acid.

In the various embodiments of the present invention, the effluent 40 from the deoxygenation reaction zone 34 and the effluent 24 from the hydrotreating reaction zone 18 are combined to form a combined effluent 42. The combined effluent 42 will include the ammonia from the effluent 24 the hydrotreating reaction zone 18 and the hydrochloric acid from the effluent 40 from the deoxygenation reaction zone 34. These two compounds will react to form ammonium chloride which will precipitate in various downstream units (the location of which will depend, in part, upon the temperature of the combined effluent 42). The precipitated salt can be washed away by wash water 43 injection. Since the two feeds stocks 10, 26 are treated separately the ammonia will form the salt upon the combination of the effluent streams 24, 40. Thus, the corrosion of the downstream equipment by the hydrochloric acid typically formed by deoxygenating the renewable feedstocks 26 can be minimized.

Returning to the FIGURE, the combined effluent 42 can be separated into one or more liquid streams 44a, 44b, 44c and one or more vapor streams 46a, 46b in separation zone 48 typically comprising a hot separator vessel 50, a cold separator vessel 52, and flash vessels 54a, 54b. As will be appreciated, in the hot separator vessel 50 the combined effluent 42 will separate into a first liquid stream 44a and a first vapor stream 46a. The first vapor stream 46a may pass through a condenser 56 and then to the cold separator vessel 52. In the cold separator vessel 52, the first vapor stream 46a will again separate into a second vapor stream 46b and a second liquid stream 42b. Returning to the hot separator vessel 50, the first liquid stream 44a may be passed to a first flash vessel 54a to provide a third vapor stream 46c and a third liquid stream 44c. The third vapor stream 46c may be passed through a condenser 58 to a second flash vessel 54b, along with the second liquid stream 42b from the cold separator vessel 52, to provide an off gas stream (not shown) and a fourth liquid stream 44d.

The vapor stream 46b from the cold separator 52 comprises unreacted hydrogen, dilute hydrogen sulfide, carbon dioxide from the decarboxylation reaction in the treating reactor, carbon monoxide, and the propane and other light hydrocarbons which are generated during the process. The gaseous fraction is treated in a scrubbing zone 60 to at least partially remove the carbon dioxide to produce the recycle gas stream 62. The carbon dioxide can be removed by means well known in the art such as absorption with an amine, reaction with a hot carbonate solution, pressure swing absorption, etc. The scrubbing zone 60 also removes the dilute hydrogen sulfide from vapor stream 46b from the cold separator 52. As will be discussed below, the recovered hydrogen sulfide may be used as a sulfiding agent for the deoxygenation catalyst.

The third liquid stream 44c and the fourth liquid stream 44d, from the first flash vessel 54a and the second flash vessel 54b respectively, of the combined effluent stream 42 can be sent to a stripping zone 64 having a stripping column 66 comprising trays or packing to separate the components of the liquid streams into an overhead 68 comprising unstable naphtha and a stripper bottoms stream 70 which comprises a sweetened effluent stream. The stripper bottoms stream 70 may be heated and passed to a fractionation column 72 to provide one or more transportation fuels streams, such as a naphtha stream 74a and a diesel stream 74b. A bottoms stream 76 from the fractionation column 72 can be passed to a third reaction zone, a hydrocracking reaction zone 78.

More specifically, the bottoms stream 76 may be passed to a feed surge drum 80, and flow from the feed surge drum 80 via a charge pump 82 to a heat exchanger 84 where it is heated. The bottoms stream 76 can be further heated in a charge heater 86 and then passed to the hydrocracking reaction zone 78.

The hydrocracking reaction zone 78 comprises at least one vessel 88 with a suitable acidic hydrocracking catalyst and is operated under suitable conditions to break the larger hydrocarbon molecules into smaller, more desirable hydrocarbons. As is known, a hydrocracking catalyst comprising a hydrogenation component, for example a Group VIII metal component and/or a Group VIB metal component, generally dispersed on a support. More specifically, the hydrocracking catalyst typically contains between 5 and 50 wt % of a Group VIB metal component, measured as the trioxide, and/or between 2 and 20 wt % of a Group VIII metal component, measured as the monoxide, supported on a suitable refractory oxide. In order to provide an acidic base for the hydrocracking catalyst, the support may be an amorphous silica-alumina or zeolite. Other refractory oxides may also be utilized. The catalyst can be produced by conventional methods including impregnating a preformed catalyst support. Other methods include cogelling, co-mulling or precipitating the catalytic metals with the catalyst support followed by calcination. Preferred catalysts contain amorphous oxide supports which are extruded and subsequently impregnated with catalytic metals. The hydrocracking zone 78 is preferably operated at conditions which include a temperature from about 232 to about 427° C. (450 to 800° F.), a pressure from about 3.5 to about 17.2 MPa (500 to 2500 psig), and a liquid hourly space velocity from about 0.5 to about 5 hr$^{-1}$. The operating conditions in the hydrocracking zone 78 are selected to preferably convert at least about 20% of the material in the bottoms stream 76 into lighter hydrocarbons. As is known, a hydrogen stream 90 may be mixed with the bottoms stream 76 upstream of the hydrocracking zone 78. A hydrocracked effluent stream 90 may heat the bottoms stream 76 in the heat exchanger 84 and then be combined with the combined effluent stream 42 to allow the smaller, more desirable hydrocarbons to be separated along with the components of the combined effluent 42 as discussed above.

In many processes, the processing of the petroleum distillate feedstock 10 is a continuous process, while the processing of the renewable feedstock 26 is a batch processes. As mentioned above, in periods when the renewable feedstock is not be being processed, a hydrogen sulfide rich stream 94 comprised of the hydrogen sulfide removed from the vapor stream 46b as discussed above, may be recycled to the deoxygenation reaction zone 34 to maintain the activity of the catalyst therein.

Accordingly, a method for co-processing renewable feedstock and petroleum distillate feedstock has been provided. From the foregoing, it is to be appreciated that the exemplary embodiments of the method for co-processing renewable feedstock and petroleum distillate feedstock sulfide the deoxygenation catalyst minimize the corrosion that can be associated with the co-processing of the two different feed stocks. The exemplary embodiments of the method also help maintain the deoxygenation catalyst with the hydrogen sulfide from the vapor of the effluent. Thus, the batch processing of renewable feedstock can be accommodated in a continuous processing of petroleum distillate feedstock.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for co-processing a petroleum distillate feed and a renewable feedstock, the process comprising:
   hydrotreating a petroleum distillate feed in a hydrotreating zone comprising at least one reactor with a hydrotreating catalyst to provide a hydrotreated effluent;
   deoxygenating a renewable feedstock in a deoxygenation zone comprising at least one reactor with a deoxygenation catalyst to provide a deoxygenated effluent;
   combining the hydrotreated effluent and the deoxygenated effluent to form a combined effluent; and,
   hydrocracking at least a portion of the combined effluent in a hydrocracking zone comprising at least one reactor with an acidic hydrocracking catalyst to provide a hydrocracked effluent.

2. The process of claim 1 further comprising:
   heating the deoxygenated effluent with the hydrotreated effluent.

3. The process of claim 1 further comprising:
   combining the hydrocracked effluent with the combined effluent.

4. The process of claim 1 further comprising:
   separating the combined effluent in a fractionation zone into a one or more petroleum fractions and a bottoms stream, wherein the bottoms stream is the portion of the combined effluent that is hydrocracked.

5. The process of claim 1 further comprising:
   stripping hydrogen sulfide from at least a portion of the combined effluent; and,
   maintaining the deoxygenation catalyst with recycle gas comprising the hydrogen sulfide stripped from the at least a portion of the combined effluent.

6. The process of claim 1 further comprising:
   heating the petroleum distillate feed with the hydrotreated effluent; and,
   heating the renewable feedstock with the hydrotreated effluent.

7. A process for co-processing a petroleum distillate feed and a renewable feedstock, the process comprising:
   heating a petroleum distillate feedstock to provide a heated petroleum distillate feedstock;
   passing the heated petroleum distillate feed to a hydrotreating zone comprising at least one reactor being operated at hydrotreating conditions with a hydrotreating catalyst to provide a hydrotreated effluent;
   passing a renewable feedstock to a deoxygenation zone comprising at least one reactor being operated under deoxygenation conditions with a deoxygenation catalyst to provide a deoxygenated effluent;
   combining the hydrotreated effluent and the deoxygenated effluent to form a combined effluent; and,
   separating the combined effluent into at least one transportation fuel stream and a bottoms stream; and,
   passing the bottoms stream to a hydrocracking zone comprising at least one reactor being operated under hydrocracking conditions with an acidic hydrocracking catalyst to provide a hydrocracked effluent.

8. The process of claim 7 further comprising:
   heating the renewable feedstock to provide a heated renewable feedstock, wherein the heated renewable feedstock is passed to the deoxygenation zone.

9. The process of claim 7 further comprising:
   combining the hydrocracked effluent and the combined effluent.

10. The process of claim 8 further comprising:
    passing the hydrocracked effluent and the combined effluent to a separation zone.

11. The process of claim 10 further comprising:
    passing at least one liquid effluent stream from the separation zone to a stripping zone; and,
    removing hydrogen sulfide from the at least one liquid effluent stream in the stripping zone to provide a sweetened effluent.

12. The process of claim 11 further comprising:
    passing the sweetened effluent to a fractionation zone, wherein the fractionation zone separates the sweetened effluent into the at least one transportation fuel stream and the bottoms stream.

13. The process of claim 11 further comprising:
    passing a hydrogen sulfide from a stripping zone to the deoxygenation zone.

14. The process of claim 13 wherein the renewable feedstock is passed to the deoxygenation zone intermittently.

15. The process of claim 14 wherein the hydrogen sulfide is passed to the deoxygenation zone when the renewable feedstock is not being passed to the deoxygenation zone.

16. The process of claim 7 wherein the petroleum distillate feed is heated with the hydrotreated effluent.

17. A process for co-processing a petroleum distillate feed and a renewable feedstock, the process comprising:
    continuously hydrotreating a petroleum distillate feed in a hydrotreating zone comprising at least one reactor with a hydrotreating catalyst to provide a hydrotreated effluent;

intermittently deoxygenating a renewable feedstock in a deoxygenation zone comprising at least one reactor with a deoxygenation catalyst to provide a deoxygenated effluent;

combining the hydrotreated effluent and the deoxygenated effluent to form a combined effluent;

hydrocracking at least a portion of the combined effluent in a hydrocracking zone comprising at least one reactor with an acidic hydrocracking catalyst to provide a hydrocracked effluent;

separating hydrogen sulfide from an effluent stream in the form of a recycle gas and, passing the recycle gas to the deoxygenation zone when the renewable feedstock is not being deoxygenated.

18. The process of claim 17 further comprising:
heating the renewable feedstock with the hydrotreated effluent.

19. The process of claim 18 further comprising:
heating the petroleum distillate feed with the hydrotreated effluent.

20. The process of claim 19 further comprising:
separating the combined effluent in a fractionation zone into a plurality of streams; and, passing a stream from the fractionation zone to the hydrocracking zone.

* * * * *